(12) United States Patent
Wagner et al.

(10) Patent No.: US 12,459,473 B2
(45) Date of Patent: Nov. 4, 2025

(54) VEHICLE PEDAL SPRING RESISTANCE EMULATOR ASSEMBLY WITH POSITION SENSOR

(71) Applicant: CTS Corporation, Lisle, IL (US)

(72) Inventors: Ryan Andrew Wagner, Goshen, IN (US); David Kolberg, Granger, IN (US); Xiaofeng Huang, Chicago, IL (US)

(73) Assignee: CTS Corporation, Lisle, IL (US)

( * ) Notice: Subject to any disclaimer, the term of this patent is extended or adjusted under 35 U.S.C. 154(b) by 474 days.

(21) Appl. No.: 18/045,033

(22) Filed: Oct. 7, 2022

(65) Prior Publication Data

US 2023/0114657 A1  Apr. 13, 2023

Related U.S. Application Data

(60) Provisional application No. 63/254,378, filed on Oct. 11, 2021.

(51) Int. Cl.
*B60T 8/40* (2006.01)
*B60T 7/04* (2006.01)
(Continued)

(52) U.S. Cl.
CPC ........... *B60T 8/4086* (2013.01); *B60T 7/042* (2013.01); *B60T 7/06* (2013.01); *B60T 8/3255* (2013.01); *B60T 8/409* (2013.01); *G05G 5/03* (2013.01)

(58) Field of Classification Search
CPC .......... B60T 7/042; B60T 7/06; B60T 8/4081; B60T 8/4086; B60T 8/409; B60T 8/3255; B60T 17/22; B60K 26/021; G05G 5/03
(Continued)

(56) References Cited

U.S. PATENT DOCUMENTS 2,659,164 A * 11/1953 Durham ................... G09B 9/05
73/132
3,636,760 A  1/1972 Shoberg
(Continued)

FOREIGN PATENT DOCUMENTS

CN  201989768 U  9/2011
DE  19781694 T1  3/1999
(Continued)

OTHER PUBLICATIONS

International Search Report for Application No. PCT/US2023/072554, dated Dec. 18, 2023 (12 pages).
(Continued)

*Primary Examiner* — Thomas J Williams
(74) *Attorney, Agent, or Firm* — Michael Best & Friedrich LLP (57) ABSTRACT

A vehicle pedal emulator assembly comprising a housing and a sleeve both defining an interior cavity. The sleeve is adapted for sliding movement in the interior cavity of the housing. Respective first, second, third, and fourth springs located in opposed ends of the interior cavity of the housing are compressible in parallel in response to the sliding movement of the sleeve in the interior cavity of the housing. The first and second springs surround the shaft and extend between one end of the housing and one end of the shaft. The third and fourth springs extend between one end of the sleeve and the other end of the sleeve. The combination of an inductive sensor and a Hall Effect sensor are adapted for measurement of the position of the sleeve relative to the housing.

19 Claims, 9 Drawing Sheets

(51) Int. Cl.
  *B60T 7/06* (2006.01)
  *B60T 8/32* (2006.01)
  *G05G 5/03* (2008.04)

(58) Field of Classification Search
  USPC .......................................................... 73/132
  See application file for complete search history.

(56) References Cited

U.S. PATENT DOCUMENTS

| | | | |
|---|---|---|---|
| 4,120,387 A | 10/1978 | Otteblad et al. | |
| 4,206,636 A | 6/1980 | Hendrix | |
| 4,395,883 A | 8/1983 | Melinat | |
| 4,888,997 A | 12/1989 | Eckert et al. | |
| 4,914,388 A * | 4/1990 | Kalista | H03K 17/9525 |
| | | | 324/207.16 |
| 5,115,186 A * | 5/1992 | Reinartz | B60T 7/06 |
| | | | 188/1.11 E |
| 5,168,750 A | 12/1992 | Kurtz | |
| 5,333,706 A | 8/1994 | Mori | |
| 5,335,563 A | 8/1994 | Yamamoto et al. | |
| 5,350,225 A | 9/1994 | Steiner et al. | |
| 5,385,068 A | 1/1995 | White et al. | |
| 5,416,295 A | 5/1995 | White et al. | |
| 5,427,442 A | 6/1995 | Heibel | |
| 5,564,797 A | 10/1996 | Steiner et al. | |
| 5,590,937 A | 1/1997 | Heibel | |
| 5,793,007 A | 8/1998 | Matsumoto | |
| 5,839,280 A | 11/1998 | Troester et al. | |
| 5,962,997 A | 10/1999 | Maisch | |
| 6,008,604 A | 12/1999 | Maisch | |
| 6,105,737 A | 8/2000 | Weigert et al. | |
| 6,186,026 B1 | 2/2001 | Shaw et al. | |
| 6,213,572 B1 | 4/2001 | Linkner, Jr. et al. | |
| 6,217,131 B1 | 4/2001 | Schanzzenbach | |
| 6,226,586 B1 | 5/2001 | Luckevich et al. | |
| 6,238,011 B1 | 5/2001 | Heckmann | |
| 6,253,635 B1 | 7/2001 | Huber | |
| 6,270,172 B1 | 8/2001 | Shirai et al. | |
| 6,289,762 B1 | 9/2001 | Silva | |
| 6,298,746 B1 | 10/2001 | Shaw | |
| 6,305,506 B1 | 10/2001 | Shirai et al. | |
| 6,330,838 B1 | 12/2001 | Kalsi | |
| 6,367,886 B1 | 4/2002 | Shaw | |
| 6,390,565 B2 | 5/2002 | Riddiford et al. | |
| 6,405,117 B1 | 6/2002 | Allen et al. | |
| 6,408,712 B1 | 6/2002 | Venkata et al. | |
| 6,412,882 B1 | 7/2002 | Isono et al. | |
| 6,422,658 B1 | 7/2002 | Valeriano et al. | |
| 6,431,304 B1 | 8/2002 | Smythe | |
| 6,446,500 B1 * | 9/2002 | Marquardt | G05G 1/44 |
| | | | 73/132 |
| 6,450,588 B2 | 9/2002 | Grote et al. | |
| 6,464,306 B2 | 10/2002 | Shaw et al. | |
| 6,471,304 B1 | 10/2002 | Deml et al. | |
| 6,531,667 B2 | 3/2003 | Becker et al. | |
| 6,542,793 B2 | 4/2003 | Kojima et al. | |
| 6,554,088 B2 | 4/2003 | Severinsky et al. | |
| 6,554,744 B2 | 4/2003 | Schmidt | |
| 6,571,662 B2 | 6/2003 | Kolita | |
| 6,577,119 B1 | 6/2003 | Yaddehige | |
| 6,580,352 B1 | 6/2003 | Pino et al. | |
| 6,591,710 B1 | 7/2003 | Shaw | |
| 6,619,039 B2 | 9/2003 | Zehnder, II et al. | |
| 6,658,963 B2 | 12/2003 | Yaddehige | |
| 6,679,135 B1 | 1/2004 | Faigle et al. | |
| 6,684,987 B2 | 2/2004 | Stachowski et al. | |
| 6,736,233 B2 | 5/2004 | Beishline et al. | |
| 6,744,360 B2 | 6/2004 | Fulks et al. | |
| 6,862,950 B2 | 3/2005 | O'Neill | |
| 7,134,327 B2 | 11/2006 | Saito et al. | |
| 7,198,336 B2 | 4/2007 | Yamamoto et al. | |
| 7,331,256 B2 | 2/2008 | Allard et al. | |
| 7,347,510 B2 | 3/2008 | Schluter | |
| 7,395,734 B2 | 7/2008 | Fujiwara et al. | |
| 7,401,865 B2 | 7/2008 | Shaw | |
| 7,438,368 B2 | 10/2008 | Kohler et al. | |
| 7,614,320 B2 | 11/2009 | Fukase | |
| 7,650,212 B2 | 1/2010 | Breed et al. | |
| 7,712,371 B2 | 5/2010 | Fujiwara | |
| 7,726,195 B2 | 6/2010 | Truesdale et al. | |
| 7,748,791 B2 | 7/2010 | Joyce | |
| 7,748,792 B2 | 7/2010 | Crombez et al. | |
| 7,765,893 B2 | 8/2010 | Chol | |
| 7,770,491 B2 | 8/2010 | Ritter et al. | |
| 7,823,985 B2 | 11/2010 | Hatano | |
| 7,856,918 B2 | 12/2010 | Nen et al. | |
| 8,042,430 B2 | 10/2011 | Campbell | |
| 8,076,874 B2 | 12/2011 | Ueno et al. | |
| 8,090,514 B2 | 1/2012 | Tarasinski et al. | |
| 8,165,747 B2 | 4/2012 | Ueno et al. | |
| 8,239,100 B2 | 8/2012 | Ueno et al. | |
| 8,266,982 B2 | 9/2012 | Peniston et al. | |
| 8,305,073 B2 | 11/2012 | Kather | |
| 8,321,111 B2 | 11/2012 | Ueno et al. | |
| 8,322,800 B2 * | 12/2012 | Anderson | B60T 13/57 |
| | | | 303/114.3 |
| 8,333,130 B2 | 12/2012 | Fujiwara | |
| 8,340,863 B2 | 12/2012 | Karatsinides | |
| 8,359,140 B2 | 1/2013 | Kodaka et al. | |
| 8,496,302 B2 | 7/2013 | Fukushima | |
| 8,522,640 B2 | 9/2013 | Bryce | |
| 8,523,297 B2 | 9/2013 | Morishita | |
| 8,596,162 B2 | 12/2013 | Nozu et al. | |
| 8,634,985 B2 | 1/2014 | Zettel et al. | |
| 8,635,930 B2 | 1/2014 | Willemsen et al. | |
| 8,706,358 B2 | 4/2014 | DeWitt | |
| 8,706,375 B2 | 4/2014 | Ajiro | |
| 8,707,820 B2 | 4/2014 | Fujiwara | |
| 8,726,654 B2 | 5/2014 | Cagnac et al. | |
| 8,777,331 B2 | 7/2014 | Fukushima | |
| 8,806,976 B1 | 8/2014 | Soltys et al. | |
| 8,814,279 B2 | 8/2014 | Sekiya et al. | |
| 8,833,072 B2 | 9/2014 | Sprocq et al. | |
| 8,850,900 B2 | 10/2014 | Isono et al. | |
| 8,874,343 B2 | 10/2014 | Anderson | |
| 8,893,579 B2 | 11/2014 | Fujiwara et al. | |
| 8,931,368 B2 | 1/2015 | Fujiwara et al. | |
| 8,944,528 B2 | 2/2015 | Pursifull et al. | |
| 9,045,017 B2 | 6/2015 | Buettner et al. | |
| 9,134,748 B2 | 9/2015 | Fujiwara | |
| 9,162,655 B2 | 10/2015 | Murayama et al. | |
| 9,221,338 B2 | 12/2015 | Gauthier | |
| 9,254,829 B2 | 2/2016 | Jeon et al. | |
| 9,260,088 B2 | 2/2016 | Shand et al. | |
| 9,266,507 B2 | 2/2016 | Shand et al. | |
| 9,340,193 B2 | 5/2016 | Ganzel | |
| 9,399,462 B2 | 7/2016 | Awadi et al. | |
| 9,403,516 B2 | 8/2016 | Strengert et al. | |
| 9,442,030 B2 | 9/2016 | Fujiwara et al. | |
| 9,465,402 B2 | 10/2016 | Kaiser | |
| 9,501,083 B2 | 11/2016 | Zhou et al. | |
| 9,505,385 B2 | 11/2016 | Yasui et al. | |
| 9,539,993 B2 | 1/2017 | Crombez et al. | |
| 9,566,964 B2 | 2/2017 | Jurgens | |
| 9,580,056 B2 | 2/2017 | Ishino et al. | |
| 9,582,025 B2 | 2/2017 | Jayasuriya et al. | |
| 9,592,811 B2 | 3/2017 | Deng et al. | |
| 9,616,861 B2 | 4/2017 | Soltys et al. | |
| 9,631,918 B2 | 4/2017 | Weiberle et al. | |
| 9,651,634 B2 | 5/2017 | Kang | |
| 9,676,375 B2 | 6/2017 | Matsuoka et al. | |
| 9,707,950 B2 | 7/2017 | Wessner et al. | |
| 9,740,233 B2 | 8/2017 | Fujiwara et al. | |
| 9,804,047 B2 | 10/2017 | Pagani et al. | |
| 9,815,367 B2 | 11/2017 | Maruyama et al. | |
| 9,821,776 B2 | 11/2017 | Mayer | |
| 9,829,402 B2 | 11/2017 | Beason et al. | |
| 9,845,085 B2 | 12/2017 | Besier et al. | |
| 9,963,130 B2 | 5/2018 | Tsuchiya | |
| 9,989,987 B2 | 6/2018 | Fujiwara | |
| 10,081,340 B2 | 9/2018 | Szymczak | |
| 10,086,806 B2 | 10/2018 | Pennala et al. | |
| 10,112,587 B2 | 10/2018 | Richards et al. | |

(56) References Cited

U.S. PATENT DOCUMENTS

| | | |
|---|---|---|
| 10,124,774 B2 | 11/2018 | Kitaguchi et al. |
| 10,137,870 B2 | 11/2018 | Decker et al. |
| 10,155,505 B2 | 12/2018 | Christoff et al. |
| 10,166,954 B2 | 1/2019 | Houtman et al. |
| 10,173,661 B2 | 1/2019 | Rifici et al. |
| 10,175,712 B2 | 1/2019 | Kaijala |
| 10,239,531 B2 | 3/2019 | Kilmurray et al. |
| 10,248,152 B2 | 4/2019 | Kim et al. |
| 10,296,036 B2 | 5/2019 | Cosby et al. |
| 10,296,037 B2 | 5/2019 | Henrikson |
| 10,343,657 B2 | 7/2019 | Street et al. |
| 10,351,117 B2 | 7/2019 | Isono |
| 10,421,447 B2 | 9/2019 | Leiber et al. |
| 10,507,811 B2 | 12/2019 | Tandler et al. |
| 10,525,959 B2 | 1/2020 | Knechtges et al. |
| 10,549,737 B2 | 2/2020 | Leiber et al. |
| 2001/0052727 A1 | 12/2001 | Betts |
| 2002/0100341 A1* | 8/2002 | Kumamoto ............... G05G 1/30 74/512 |
| 2002/0108463 A1 | 8/2002 | Shaw et al. |
| 2002/0117893 A1 | 8/2002 | Shaw et al. |
| 2003/0090150 A1 | 5/2003 | Woo |
| 2003/0205931 A1* | 11/2003 | Muller ................... B60Q 1/441 303/20 |
| 2004/0004393 A1 | 1/2004 | Richard |
| 2004/0040408 A1 | 3/2004 | Shaw et al. |
| 2004/0145322 A1 | 7/2004 | Trutschel et al. |
| 2004/0187625 A1 | 9/2004 | Schiel et al. |
| 2004/0251095 A1 | 12/2004 | Simard et al. |
| 2005/0082909 A1 | 4/2005 | Constantakis et al. |
| 2005/0217414 A1 | 10/2005 | Gibson |
| 2005/0223836 A1 | 10/2005 | Gibson |
| 2006/0027096 A1 | 2/2006 | Giering et al. |
| 2006/0064977 A1 | 3/2006 | Ohlig et al. |
| 2006/0185469 A1 | 8/2006 | Schlabach |
| 2006/0224284 A1 | 10/2006 | Ueno et al. |
| 2007/0068306 A1 | 3/2007 | Herrick et al. |
| 2007/0112473 A1 | 5/2007 | Ueno et al. |
| 2007/0159126 A1 | 7/2007 | Nobuyasu et al. |
| 2007/0193401 A1 | 8/2007 | Campbell |
| 2007/0296268 A1 | 12/2007 | Shaw et al. |
| 2008/0276749 A1 | 11/2008 | Stewart et al. |
| 2011/0041647 A1 | 2/2011 | Soltys |
| 2011/0143320 A1 | 6/2011 | McCormick et al. |
| 2013/0074634 A1 | 3/2013 | Al-Rubb |
| 2014/0060239 A1 | 3/2014 | Hemmege Venkatappa et al. |
| 2014/0360177 A1 | 12/2014 | Ryu et al. |
| 2015/0001915 A1 | 1/2015 | Murayama et al. |
| 2015/0001917 A1 | 1/2015 | Murayama et al. |
| 2015/0001918 A1 | 1/2015 | Murayama et al. |
| 2016/0016569 A1 | 1/2016 | Odaira et al. |
| 2016/0160892 A1* | 6/2016 | Schepp ............... F15B 15/1428 29/464 |
| 2017/0001615 A1 | 1/2017 | Adler et al. |
| 2017/0067228 A1 | 3/2017 | Hagman |
| 2017/0225664 A1 | 8/2017 | Beever |
| 2017/0334344 A1 | 11/2017 | Salter et al. |
| 2017/0351291 A1 | 12/2017 | Schoenfuss et al. |
| 2018/0043866 A1 | 2/2018 | Monsere et al. |
| 2018/0056963 A1 | 3/2018 | Krueger et al. |
| 2018/0093648 A1 | 4/2018 | Pennala et al. |
| 2018/0126966 A1 | 5/2018 | Crum |
| 2018/0141530 A1 | 5/2018 | Kilmurray et al. |
| 2018/0208163 A1 | 7/2018 | Lee et al. |
| 2018/0253121 A1 | 9/2018 | Stuart et al. |
| 2018/0257656 A1 | 9/2018 | Zhao et al. |
| 2018/0259407 A1 | 9/2018 | Hardy et al. |
| 2018/0275712 A1* | 9/2018 | Isono ..................... F16F 3/04 |
| 2018/0283967 A1 | 10/2018 | Kato |
| 2018/0290640 A1 | 10/2018 | Johnson et al. |
| 2018/0356853 A1 | 12/2018 | Suntharalingam |
| 2018/0370515 A1 | 12/2018 | Kim |
| 2019/0092298 A1 | 3/2019 | Bach et al. |
| 2019/0100137 A1 | 4/2019 | Wolf-Monheim |
| 2019/0121385 A1 | 4/2019 | Lee |
| 2019/0126898 A1* | 5/2019 | Anderson ............... B60T 8/409 |
| 2019/0271570 A1 | 9/2019 | Zhao et al. |
| 2019/0308597 A1 | 10/2019 | Seibert |
| 2019/0350757 A1 | 11/2019 | Charles |
| 2019/0359194 A1 | 11/2019 | Bindl et al. |
| 2020/0001711 A1* | 1/2020 | Burke ..................... G05G 5/05 |
| 2020/0003300 A1 | 1/2020 | Yang |
| 2020/0025113 A1 | 1/2020 | Glugla et al. |
| 2020/0353908 A1 | 11/2020 | Street et al. |
| 2021/0291797 A1* | 9/2021 | Pflaum .................... F15B 15/20 |
| 2022/0219659 A1 | 7/2022 | Wagner et al. |
| 2022/0314939 A1 | 10/2022 | Wagner |
| 2023/0114657 A1* | 4/2023 | Wagner ................. B60T 8/4086 303/113.4 |
| 2024/0075910 A1 | 3/2024 | Wagner |

FOREIGN PATENT DOCUMENTS

| | | |
|---|---|---|
| DE | 19755481 A1 | 6/1999 |
| DE | 19825231 A1 | 12/1999 |
| DE | 19510522 C2 | 2/2000 |
| DE | 19836692 A1 | 2/2000 |
| DE | 10043255 A1 | 3/2002 |
| DE | 10341277 A1 | 3/2005 |
| DE | 10347838 A1 | 3/2005 |
| DE | 10347843 A1 | 4/2005 |
| DE | 102004023007 A1 | 12/2005 |
| DE | 102004041733 B4 | 7/2006 |
| DE | 102005033179 A1 | 1/2007 |
| DE | 202007000827 U1 | 4/2007 |
| DE | 102006001683 A1 | 7/2007 |
| DE | 102007018962 A1 | 10/2008 |
| DE | 102007030312 A1 | 1/2009 |
| DE | 102007035326 A1 | 1/2009 |
| DE | 102010000882 A1 | 7/2010 |
| DE | 202010008405 U1 | 12/2010 |
| DE | 102009055251 A1 | 6/2011 |
| DE | 102010024735 A1 | 12/2011 |
| DE | 102011106396 A1 | 4/2012 |
| DE | 102010061439 A1 | 6/2012 |
| DE | 102010216239 A1 | 10/2012 |
| DE | 102011117264 A1 | 11/2012 |
| DE | 102012024846 A1 | 8/2013 |
| DE | 102013204778 A | 9/2013 |
| DE | 102012106213 A1 | 1/2014 |
| DE | 102013106654 A1 | 1/2015 |
| DE | 102016201784 A1 | 9/2016 |
| DE | 202016106697 U1 | 3/2017 |
| DE | 102004013868 B4 | 8/2017 |
| DE | 102016212931 A1 | 1/2018 |
| DE | 102007047547 B4 | 2/2018 |
| DE | 102016116619 A1 | 3/2018 |
| DE | 102016219219 A1 | 4/2018 |
| DE | 102018100072 A1 | 8/2018 |
| DE | 102017104278 A1 | 9/2018 |
| DE | 102017004518 A1 | 11/2018 |
| DE | 102017211955 A1 | 1/2019 |
| DE | 102017218384 A1 | 4/2019 |
| DE | 102016219622 B4 | 6/2019 |
| DE | 112017004866 T5 | 6/2019 |
| DE | 102008026751 B4 | 3/2020 |
| EP | 0136689 A2 | 4/1985 |
| EP | 0136690 A2 | 4/1985 |
| EP | 0301018 B1 | 6/1992 |
| EP | 0786387 A2 | 7/1997 |
| EP | 1055912 A2 | 11/2000 |
| EP | 1577184 A2 | 9/2005 |
| EP | 1078833 B1 | 11/2005 |
| EP | 1394007 B1 | 8/2007 |
| EP | 1654137 B1 | 10/2008 |
| EP | 1781516 B1 | 6/2010 |
| EP | 2806255 A2 | 11/2014 |
| EP | 2818444 A1 | 12/2014 |
| EP | 2879924 B1 | 6/2015 |
| EP | 2826680 B1 | 2/2016 |
| EP | 3213168 B1 | 7/2018 |
| EP | 2731838 B1 | 9/2018 |
| EP | 3375678 B1 | 2/2020 |
| EP | 2926090 B1 | 3/2020 |

(56) References Cited

FOREIGN PATENT DOCUMENTS

| | | |
|---|---|---|
| EP | 3589518 B1 | 4/2021 |
| GB | 2451559 A | 2/2009 |
| GB | 2871102 A1 | 5/2015 |
| JP | H08150263 A | 6/1996 |
| WO | WO2001001066 A1 | 1/2001 |
| WO | 2001040038 A1 | 6/2001 |
| WO | WO20160186979 A1 | 11/2016 |
| WO | 2017202512 A1 | 11/2017 |
| WO | WO2018029472 A1 | 2/2018 |
| WO | WO20180104740 A1 | 6/2018 |

OTHER PUBLICATIONS

International Search Report and Written Opinion for Application No. PCT/US2022/012012 dated May 3, 2022 (17 pages).
Ams: New Magnetic Position Sensors for automotive applications Support Full ISO26262 Compliance and Provide SysteminPackage (SiP) Format. Business Wire—2016; https://dialog.proquest.com/professional/docview/1784083696/15CC904FA1C11CA0C95/123?accountid=157282 (3 pages).
Chinese Patent Office Action for Application No. 202080033525.9 dated Feb. 4, 2024 (9 pages).
International Search Report and Written Opinion for Application No. PCT/US2022/077796 dated Jan. 25, 2023 (13 pages).

* cited by examiner

VEHICLE PEDAL SPRING RESISTANCE EMULATOR ASSEMBLY WITH POSITION SENSOR

CROSS-REFERENCE TO RELATED APPLICATIONS

This application claims priority to U.S. provisional application No. 63/254,378 filed Oct. 11, 2021 and titled "Vehicle Pedal Spring Resistance Emulator Assembly with Position Sensor," which is hereby incorporated by reference in its entirety.

FIELD

This arrangement relates to a vehicle pedal spring resistance emulator assembly with a position sensor and, more specifically, a vehicle brake pedal spring resistance emulator assembly with a position sensor.

BACKGROUND

Brake-by-wire vehicle brake pedals do not utilize a conventional vacuum or hydraulic system for braking.

There is a desire to replicate or emulate the feel of a conventional vacuum or hydraulic braking system in brake-by-wire vehicle brake pedals.

The present arrangement is directed to a brake-by-wire vehicle brake pedal and, more specifically, a vehicle brake pedal spring resistance emulator assembly that replicates or emulates the resistance feel of a conventional vacuum or hydraulic braking system.

The present arrangement is also directed to a brake-by-wire vehicle brake pedal and, more specifically, a vehicle brake pedal spring resistance emulator assembly with a position sensor for sensing the position of the vehicle brake pedal.

SUMMARY

The present arrangements are directed generally to a vehicle pedal emulator assembly comprising a housing defining an interior cavity, a sleeve extending and adapted for sliding movement in the interior cavity of the housing, first and second springs in one end of the interior cavity of the housing, the first and second springs being compressible in response to the sliding movement of the sleeve in the interior cavity of the housing, and third and fourth springs in an opposed end of the interior cavity of the housing, the third and fourth springs being compressible in response to the sliding movement of the sleeve in the interior cavity of the housing.

In one aspect, the sleeve defines an interior cavity, the third and fourth springs being located in the interior cavity of the sleeve.

In one aspect, the sleeve defines an interior cavity, the first spring extending into the interior cavity of the sleeve.

In one aspect, a shaft extends in the interior cavity of the housing and into the interior cavity of the sleeve, the first and second springs surrounding the shaft.

In one aspect, a shaft extends in the interior cavity of the housing and into the interior cavity of the sleeve, the third spring extending between an end of the sleeve and an end of the shaft.

In one aspect, the vehicle pedal emulator further comprises an inductive sensor for sensing the position of the sleeve relative to the housing, and a Hall Effect sensor for sensing the position of the sleeve relative to the housing.

In one aspect, the vehicle pedal emulator further comprises a printed circuit board with an inductive coil and a Hall Effect integrated circuit, the printed circuit board being located on the housing, an inductive target on the sleeve and moveable relative to the inductive coil in response to the sliding movement of the sleeve relative to the housing, and a Hall Effect magnet on the sleeve and moveable relative to the Hall Effect integrated circuit in response to the sliding movement of the sleeve relative to the housing.

In one aspect, the vehicle pedal emulator further comprises a wake-up switch which is actuable in response to the sliding movement of the sleeve relative to the housing.

In one aspect, the vehicle pedal emulator further comprises a lever on the wake-up switch which is actuable in response to contact with a tab on the sleeve in response to the sliding movement of the sleeve relative to the housing.

In one aspect, the vehicle pedal emulator further comprises a printed circuit board located on the housing, the wake-up switch being located on the printed circuit board.

In one aspect, the first and second springs are disposed in a telescoping relationship relative to each other.

In one aspect, the third and fourth springs are disposed in a telescoping relationship relative to each other.

In one aspect, the first, second, third, and fourth springs are arranged and compressible in a parallel relationship.

The present arrangements are also directed to a vehicle pedal emulator assembly comprising a housing defining an interior cavity, a sleeve extending and adapted for sliding movement in the interior cavity of the housing, the sleeve defining an interior cavity, a shaft extending in the interior cavity of the housing and into the interior cavity of the sleeve, first and second springs in one end of the interior cavity of the housing, the first and second springs being compressible in response to the sliding movement of the sleeve in the interior cavity of the housing, the first spring extending into the interior cavity of the sleeve, and third and fourth springs in an opposed end of the interior cavity of the housing, the third and fourth springs being compressible in response to the sliding movement of the sleeve in the interior cavity of the housing, the third spring extending into the interior cavity of the sleeve.

In one aspect, the first spring surrounds the shaft and the second spring surrounds the first spring.

In one aspect, the third spring extends between an end of the sleeve and an end of the shaft, the fourth spring surrounding the third spring.

In one example, the first, second, third, and fourth springs are arranged and compressible in a parallel relationship.

In one example, the first and second springs surround the shaft and extend between one end of the housing and one end of the sleeve, the third and fourth springs extending between one end of the sleeve and the other end of the shaft.

Other advantages and features of the present arrangements will be more readily apparent from the following detailed description of the arrangements, the accompanying drawings, and the appended claims.

BRIEF DESCRIPTION OF THE DRAWINGS

These and other features can best be understood by the description of the accompanying FIGS. as follows.

DETAILED DESCRIPTION

Figure 1:
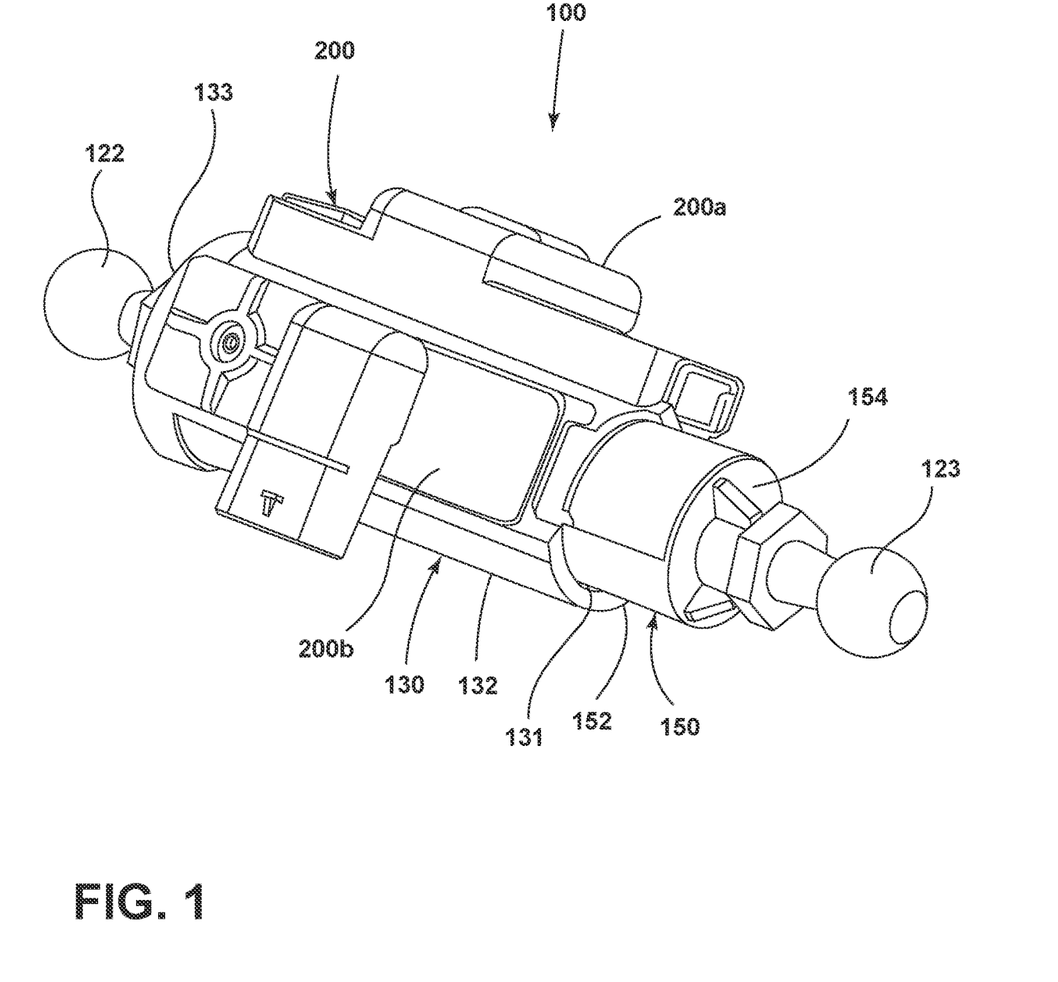
FIG. 1 is a perspective view of a vehicle brake pedal spring resistance emulator assembly.
Figure 2:
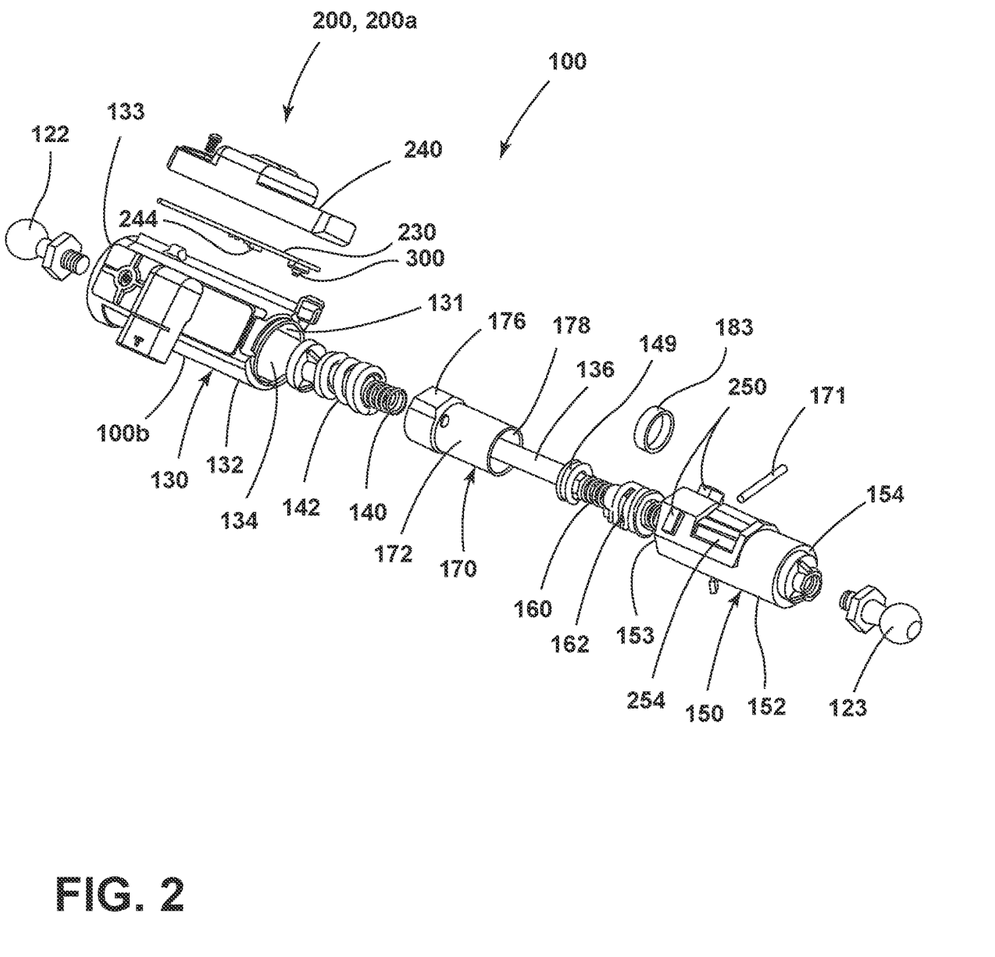
FIG. 2 is an exploded view of the vehicle brake pedal spring resistance emulator assembly shown in FIG. 1.

FIGS. 1 and 2 depict the vehicle brake pedal spring resistance emulator assembly or module or member 100 in accordance with the arrangements.

Figure 3:
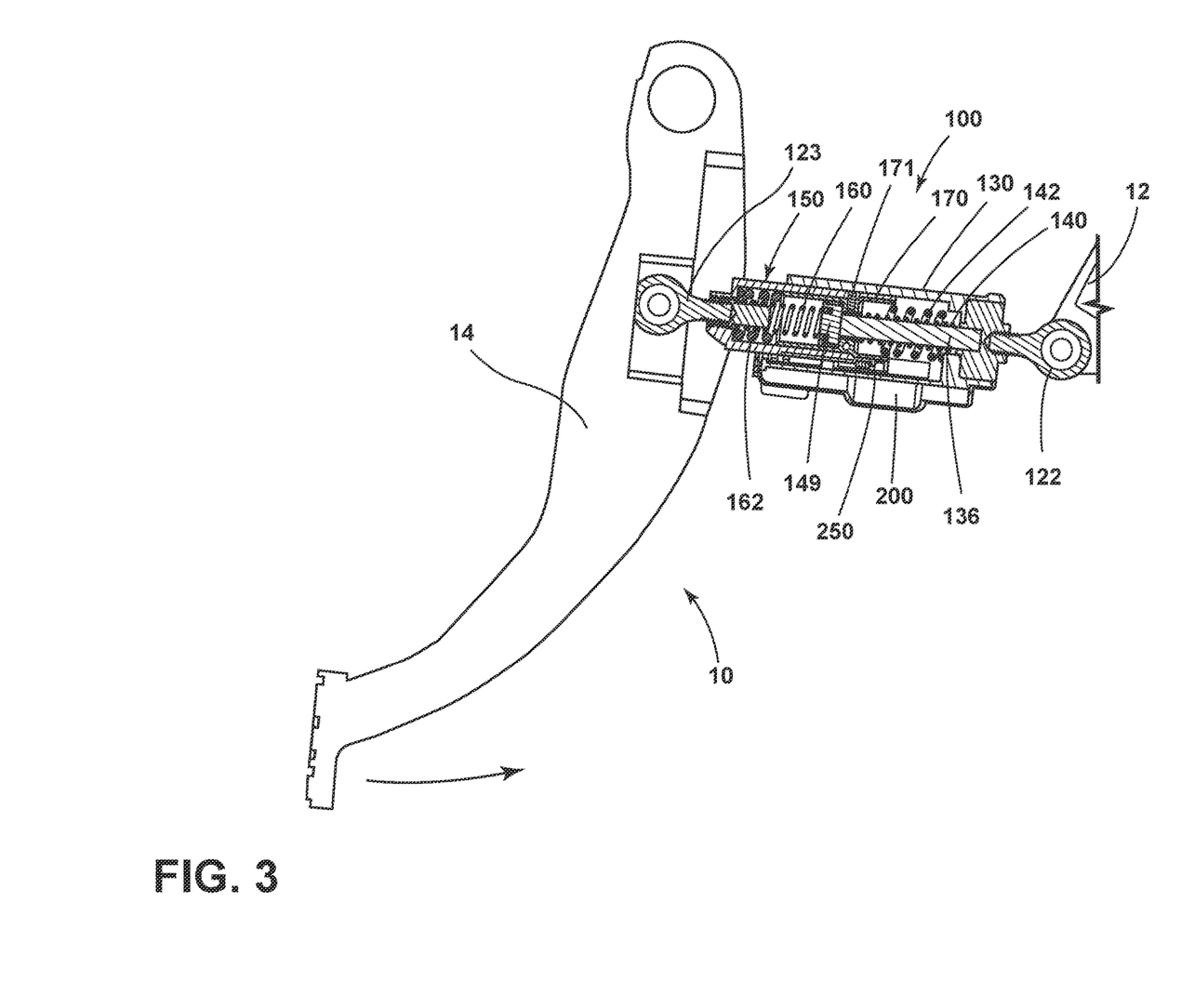
FIG. 3 is a vertical cross-sectional view of the vehicle brake pedal spring resistance emulator assembly shown in FIG. 1 extending and coupled between a vehicle pedal arm and a vehicle floor bracket with both the vehicle brake pedal spring resistance emulator assembly and vehicle pedal arm in a disengaged and fully extended position.
Figure 4:
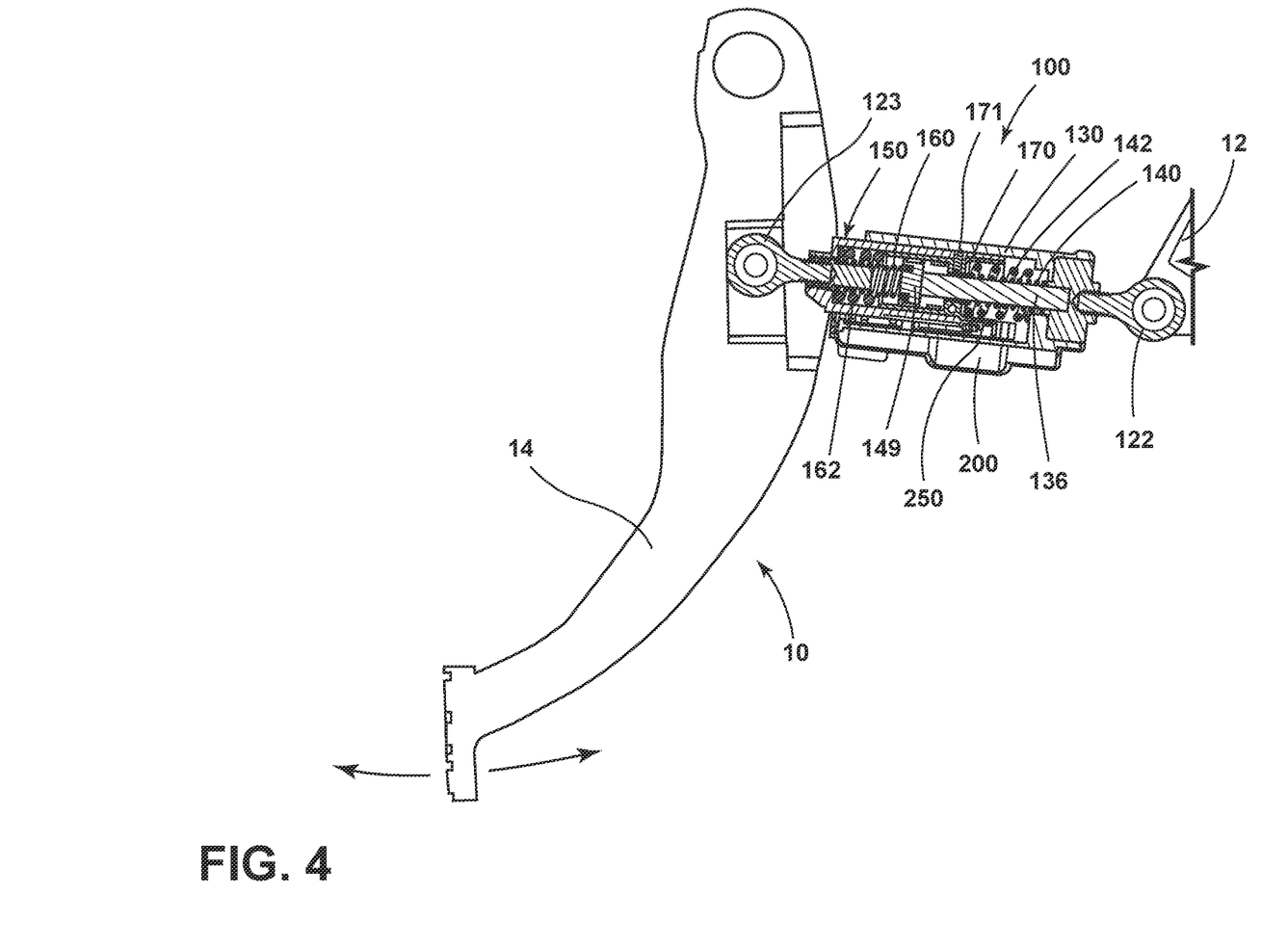
FIG. 4 is a vertical cross-sectional view of the vehicle brake pedal spring resistance emulator shown in FIG. 1 extending and coupled between a vehicle pedal arm and the vehicle floor bracket with both the vehicle brake pedal spring resistance emulator assembly nd vehicle pedal arm in a first engaged and compressed position.
Figure 5:
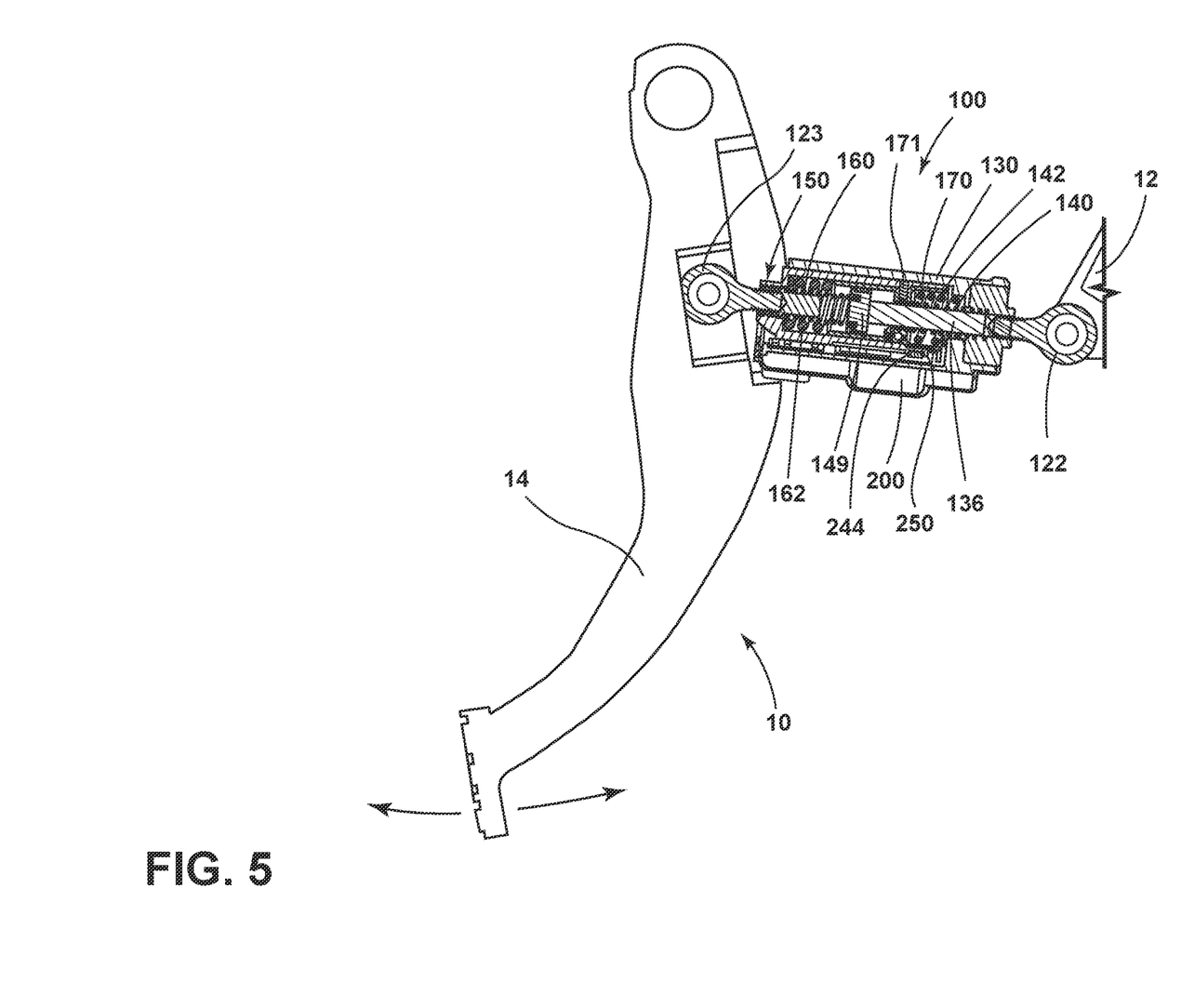
FIG. 5 is a vertical cross-sectional view of the vehicle brake pedal spring resistance emulator assembly shown in FIG. 1 extending and coupled between a vehicle pedal arm and the vehicle floor bracket with both the vehicle brake pedal spring resistance emulator assembly and vehicle pedal arm in a fully engaged and compressed position.

FIGS. 3, 4, and 5 depict the vehicle brake pedal spring resistance emulator assembly 100 coupled to a vehicle brake pedal assembly 10 which, in the embodiment shown, includes a base/bracket 12 and an elongate brake pedal arm 14 adapted or configured for counterclockwise/engaging/ braking and clockwise/disengaging/non-braking rotation and movement.

The vehicle brake pedal spring resistance emulator assembly 100 is operably coupled to the vehicle brake pedal assembly 10 in a relationship extending between the base/ bracket 12 and the underside of the brake pedal arm 14 and further in a relationship with a first end bracket or ball stud 122 thereof is operatively coupled to the underside of the brake pedal arm 14 and a second opposed end bracket or adjustable eyelet 123 coupled to the pedal base/bracket 12.

Figure 2A:
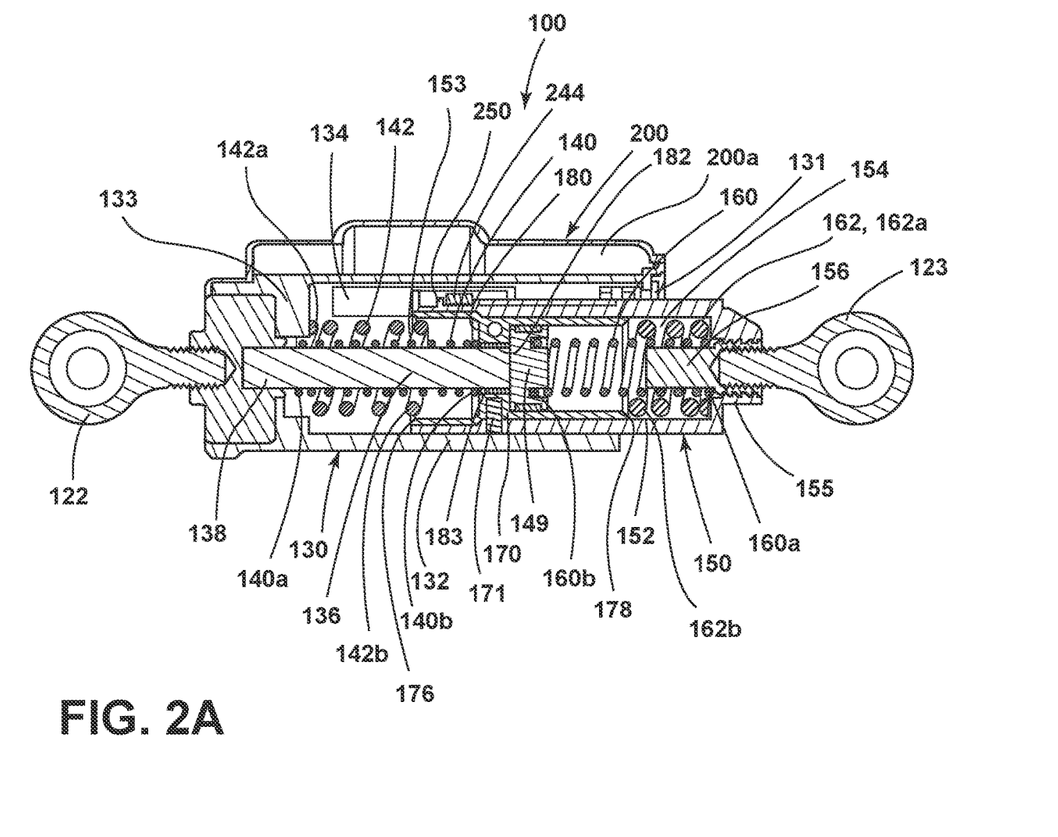
FIG. 2A is vertical cross-sectional view of the vehicle brake pedal spring resistance emulator assembly shown in FIG. 1.

The vehicle brake pedal emulator assembly 100 is generally in the form and shape of an elongate elastomeric hollow cylinder or housing or tube comprising a first generally cylindrical elongate hollow interior cylinder or tubular housing or sleeve 130 including an exterior circumferential wall 132 defining and forming an interior hollow elongate cylindrically or tubular shaped receptacle or cavity or hollow interior chamber 134 as shown in FIGS. 1, 2 and 2A.

The housing or sleeve 130 defines a first open end 131 in communication with the hollow interior chamber 134 and an opposed closed end 133 that includes and is closed by the first end bracket or ball stud 122 as shown in FIGS. 1, 2, and 2A.

An elongate shaft 136 extends through the interior of the cavity or chamber 134 defined by the housing or sleeve 130 and includes a first end 138 extending into the first end bracket 122 and an opposed second end including a spring receptacle 149 as shown in FIGS. 2, 2A and 3. The shaft 136 extends in a relationship co-linear with the longitudinal axis of the housing or sleeve 130.

A first pair of helical elongate compression springs 140 and 142 are located in the interior cavity 134 of the housing 130 and surround the shaft 136 in a telescoping relationship with the helical elongate compression spring 140 surrounding the shaft 136 and the helical elongate compression spring 142 surrounding and spaced from the spring 140.

The vehicle brake pedal emulator assembly 100 further comprises a second generally cylindrical elongate elastomeric hollow interior cylinder or tubular housing or sleeve 150 including an exterior circumferential wall 152 defining and forming an interior hollow elongate cylindrically or tubular shaped receptacle or cavity or chamber 154 as shown in FIGS. 1, 2, and 2A.

The sleeve 150 defines a first open end 153 extending into the cavity or chamber 134 of the first housing or sleeve 130 and an opposed closed end 155. The second opposed end bracket 123 is threadingly secured and extends outwardly from the closed end 155 as shown in FIGS. 2 and 2A.

A metal shaft 156 extends inwardly from the closed end 155 and into the interior of the cavity or chamber 154 defined by the sleeve 150 as shown in FIG. 2A.

A second pair of helical elongate compression springs 160 and 162 are located in the interior cavity 154 of the sleeve 150 and surround the shaft 156 in a telescoping relationship with the helical elongate compression spring 160 surrounding the shaft 156 and the helical elongate compression spring 162 surrounding and spaced from the spring 160 as shown in FIG. 2A, and FIGS. 3-5.

The sleeve 150 extends in a relationship generally co-linear with the longitudinal axis of the housing 130 and is adapted or configured for sliding back and forth movement within the interior of the cavity 134 of the housing 130 as described in more detail below.

The vehicle brake pedal emulator assembly 100 further comprises a third generally cylindrical elongate metal hollow interior cylinder or tubular housing or sleeve 170 including an exterior circumferential wall 172 defining and forming an interior hollow elongate cylindrically or tubular shaped receptacle or cavity or chamber 174.

The sleeve 170 includes opposed open ends 176 and 178 with the open end 176 defining a spring receptacle. The sleeve 170 also includes an interior shoulder 180 defining a through-hole or opening 182 as shown in FIG. 2A. The sleeve 170 is located and secured in the cavity or chamber 154 of the sleeve 150 via a pin 171 shown in FIGS. 4 and 5.

The sleeve 170 includes opposed open ends 176 and 178 with the open end 178 configured to receive the spring receptacle 149. The sleeve 170 also includes an interior shoulder 180 defining a through-hole or opening 182 as shown in FIG. 2A. The sleeve 170 is located and secured in the cavity or chamber 154 of the sleeve 150 via a pin 171 shown in FIGS. 4 and 5.

A bearing 183 is located between the shaft 136 and the interior shoulder 180 and supports the shaft 136 for linear back and forth sliding movement through the sleeve 150 as shown in FIGS. 2 and 2A.

The helical elongate compression spring 140 includes a first end 140a in abutting relationship with the closed end 133 of the housing 130 and an opposed second end 140b extending through the open end 153 of the sleeve 150 and the open end 176 of the sleeve 170 and into an abutting relationship with the interior shoulder 180 of the sleeve 170 as shown in FIG. 2A.

The helical elongate compression spring 142 includes a first end 142a in abutting relationship with the interior face of the closed end 133 of the housing 130 and an opposed free second end 142b which is spaced from the interior shoulder 180 of the sleeve 170 in the disengaged and fully extended relationship of the vehicle brake pedal emulator assembly 100 as shown in FIGS. 2A and 3.

The helical elongate compression spring 160 includes a first end 160a in abutting relationship with the closed end 155 of the sleeve 150 and an opposed second end 160b in abutting relationship with the spring receptacle 149 end of the shaft 136.

The helical elongate compression spring 162 includes a first end 162a in abutting relationship with the interior face of the closed end 155 of the sleeve 150 and an opposed second end 162b which is spaced from the spring receptacle 149 end of the shaft 136 in the disengaged and fully extended relationship of the vehicle brake pedal emulator assembly 100 as shown in FIGS. 2A and 3.

In the embodiment shown, the helical elongate compression springs 140 and 160 comprise the stage 1 pedal force resistance emulator springs of the vehicle brake pedal emulator assembly 100, the helical elongate compression spring 142 comprises the stage 2 pedal force emulator spring, and the spring 162 comprises the stage 3 pedal force emulator spring.

Thus, in the embodiment shown, the vehicle brake pedal emulator assembly 100 includes a total of four pedal force resistance springs with two such helical elongate compression springs 140 and 142 located at one end of the assembly 100 and the other two such helical elongate compression springs 160 and 162 located at the opposed end of the assembly 100 with the sleeve 150 positioned and located between and separating the helical elongate compression springs 140 and 142 from the helical elongate compression springs 160 and 162.

Moreover, in the embodiment shown, the helical elongate compression springs 140 and 160 are positioned opposite and spaced from each other in a co-linear relationship and the helical elongate compression springs 142 and 162 are positioned opposite and spaced from each other in a co-linear relationship.

The vehicle brake pedal emulator assembly 100 is adapted to create and generate linear resistance forces on the brake pedal arm 14 in response to the travel or movement or stroke of the brake pedal arm 14 during operation of a vehicle with a brake-by-wire system and which emulates the resistance feel of a vehicle with a conventional vacuum or hydraulic braking system.

Specifically, and referring to FIGS. 3 and 4, it is understood that an initial depression of the brake pedal arm 14 by the foot of a vehicle operator causes inward sliding movement of the sleeve 150 into the interior cavity 134 of the housing or sleeve 130 which results in the compression of both of the stage 1 helical elongate compression springs 140 and 160, which results in the generation of a stage 1 resistive force against the brake pedal arm 14.

Moreover, and referring to FIGS. 4 and 5, it is further understood that the further depression of the brake pedal arm 14 by the foot of the vehicle operator causes further inward sliding movement of the sleeve 150 into the interior cavity 134 of the housing or sleeve 130 which results in the further compression of the stage 1 helical elongate compression springs 140 and 160 and also the compression of the spring 142 as a result of the opposed second end 142b of the spring 142 coming into abutting relationship with the interior shoulder 180 of the sleeve 170 so as to generate a stage 2 pedal resistance force against the brake pedal arm 14 that is greater in magnitude than the stage 1 pedal resistance force.

Still further with reference to FIG. 5, it is still further understood that the still further depression of the pedal arm 14 by the foot of the vehicle operator causes still further inward sliding movement of the sleeve 150 into the interior cavity 134 of the housing or sleeve 130, which results in the still further compression of the stage 1 helical elongate compression springs 140 and 160, the further compression of the spring 142, and the compression of the spring 162 as a result of the first end 162a of the spring 162 coming into abutting relationship with the end of the shaft 136 so as to generate a stage 3 pedal resistance force against the brake pedal arm 14 that is greater in magnitude that the combination of the stage 1 and pedal resistance forces.

It is thus understood that in the embodiment shown, the helical elongate compression springs 140, 142, 160, and 162 function and compress in a parallel relationship relative or with respect to each other in which all of the helical elongate compression springs 140, 142, 160, and 162 are compressed together and simultaneously during at least a portion of the operation of the vehicle brake pedal emulator assembly 100.

The vehicle brake pedal emulator assembly 100 still further comprises a position sensor assembly 200 for sensing the position of the sleeve 150 relative or with respect to the housing 130 and thus for sensing the position of the brake pedal arm 14.

Referring to FIGS. 1, 2, 3, and 6, the position sensor assembly 200 includes redundant position sensor assemblies 200a and 200b as shown in FIGS. 1 and 2, each including an inductive position sensor assembly 210 and a Hall Effect position sensor assembly 220.

Specifically, and with reference to the position sensor assembly 200a depicted in FIGS. 1, 2, 3, and 6, the position sensor assembly 200a includes a printed circuit board 230 and a connector assembly 240. The printed circuit board 230 includes an inductive coil 242 defined and formed on the lower surface 230a thereof and further includes a Hall Effect integrated circuit 244 mounted to the lower surface 230a thereof. The board 230 also includes a wake-up micro switch 300 mounted to the top surface 230b of the board 230.

Figure 6:
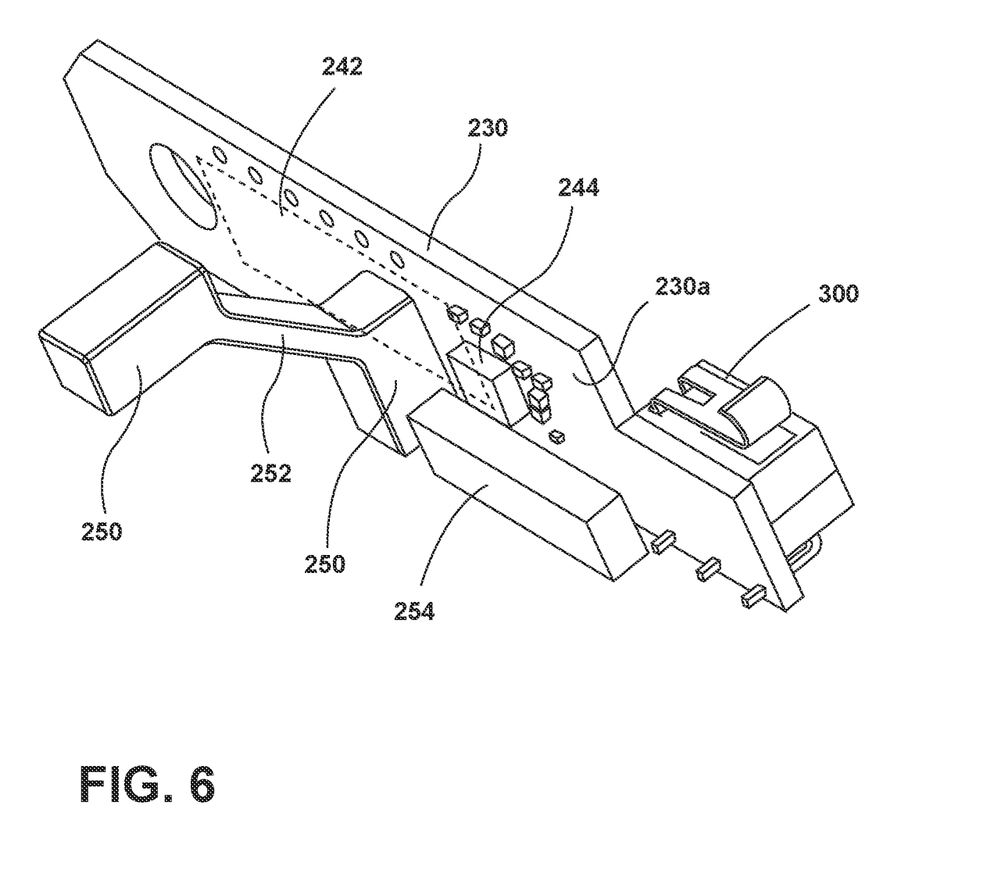
FIG. 6 is a simplified exploded perspective view of the position sensor assembly of the vehicle brake pedal spring resistance emulator assembly.

The board 230 is mounted to the exterior face of exterior wall 132 of the housing 130. The connector assembly 240 is mounted over and operably electrically connected to the printed circuit board 230 as shown in FIGS. 2 and 6.

In the embodiment as shown in FIGS. 1 and 2, the redundant position sensor assemblies 200a and 200b are positioned and mounted on the exterior face of the exterior wall 132 of the housing 130 in a side-by-side and diametrically opposed relationship relative to each other.

The position sensor assembly 200 and, more specifically each of the redundant position sensor assemblies 200a and 200b thereof, also includes an inductive target 250 and a Hall effect magnet 254. FIG. 6 depicts the pair of inductive targets 250 for the respective position sensor assemblies 200a and 200b coupled to a common or shared bracket 252. FIGS. 2 and 6 depict only one of the Hall Effect magnets 254 but it is understood that the other Hall Effect magnet 254 is located and molded in the exterior face of the exterior wall 152 of the sleeve 150 in a relationship and position diametrically opposed to the Hall Effect magnet 254 shown in FIG. 2.

Referring to FIGS. 2 and 3, the inductive target 250 is coupled or molded into the material of the exterior wall 152 of the sleeve 150 so as to be moveable longitudinally relative to or with respect to the housing 130 in response to the sliding movement of the sleeve 150 relative to the housing 130.

In a similar manner as shown in FIG. 2, the Hall Effect magnet 254 is coupled or molded into the material of the exterior wall 152 of the sleeve 150 so as to moveable longitudinally relative to the housing 130 in response to the sliding movement of the sleeve 150 relative to the housing 130.

In the embodiment shown, the inductive target 250 and the Hall Effect magnet 254 are positioned in a relationship opposed and spaced from the inductive coil 242 and the Hall Effect integrated circuit 244 on the printed circuit board 230. Still more specifically, in the embodiment shown, it is understood that the exterior wall 132 of the housing 130 separates the printed circuit board 230, and more specifically, the inductive coil 242 and Hall Effect integrated circuit 244 thereon, from the associated inductive target 250 and the Hall Effect magnet 254. Stated another way, the exterior wall 132 of the housing 130 separates the printed circuit board 230, and more specifically the inductive coil 242 and Hall Effect integrated circuit 244, from the inductive target 250 and Hall Effect magnet 254.

It is understood that the longitudinal movement of the inductive target 250 relative to the housing 130 and thus relative to the inductive coil 242 formed on the board 230 results in a change in the inductance of the inductive coil 242 which is sensed and measured so as to allow the position of the sleeve 150 and thus the position of the brake pedal arm 14 to be determined and measured by an electronic control unit (ECU) associated with the vehicle for applying or releasing the vehicle brakes.

It is also understood that the longitudinal movement of the Hall Effect magnet 254 relative to the housing 130 and thus relative to the Hall Effect integrated circuit 244 on the printed circuit board 230 results in a change in the magnitude and/or direction of the magnetic field sensed by the Hall Effect integrated circuit 244 which is sensed and measured so as to allow the position of the sleeve 150 and thus the position of the brake pedal arm 14 to be determined and measured by an ECU associated with the vehicle for applying or releasing the brakes.

The incorporation of both an inductive sensor and a Hall Effect sensor on the circuit board 230 allows for a higher functional safety and the redundant measurement of the position of the brake pedal arm 14 in the event of a malfunction in either of the inductive sensor or the Hall Effect sensor. The incorporation of a second circuit board 230 with a second set of inductive and Hall Effect sensors allows for the redundant measurement of the position of the brake pedal arm 14 in the event of a malfunction with the other circuit board 230 or the sensors thereon.

The vehicle brake pedal emulator assembly 100 still further comprises the wake-up switch 300 that provides a wake-up function by opening a circuit when the vehicle brake pedal emulator assembly 100 is in its extended and disengaged position and closes the circuit when the vehicle brake pedal emulator assembly 100 is in its engaged and compressed position.

Figure 7:
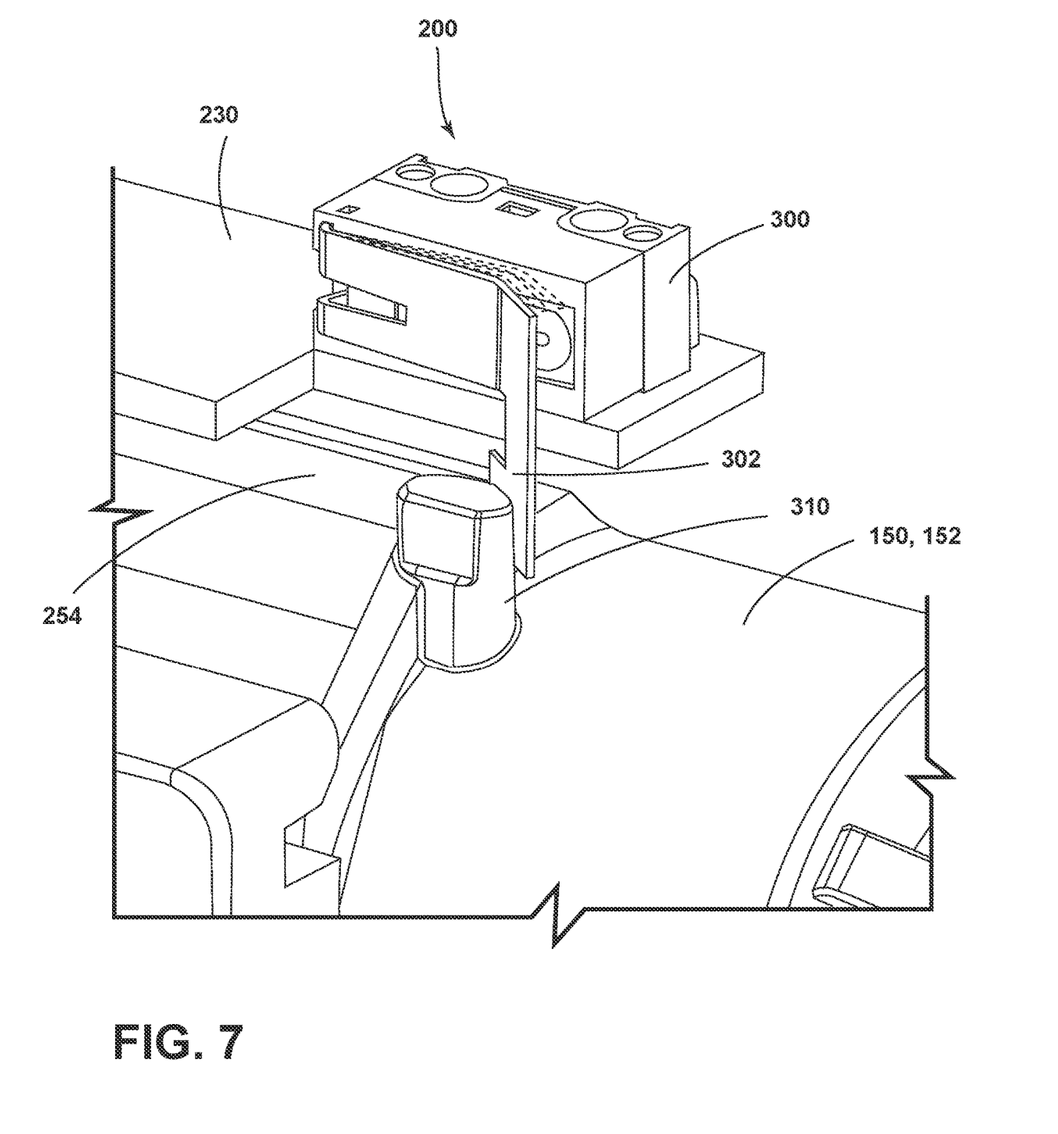
FIG. 7 is an enlarged broken perspective view of the assembly for activation of the wake-up switch of the vehicle brake pedal spring resistance emulator assembly.
Figure 8:
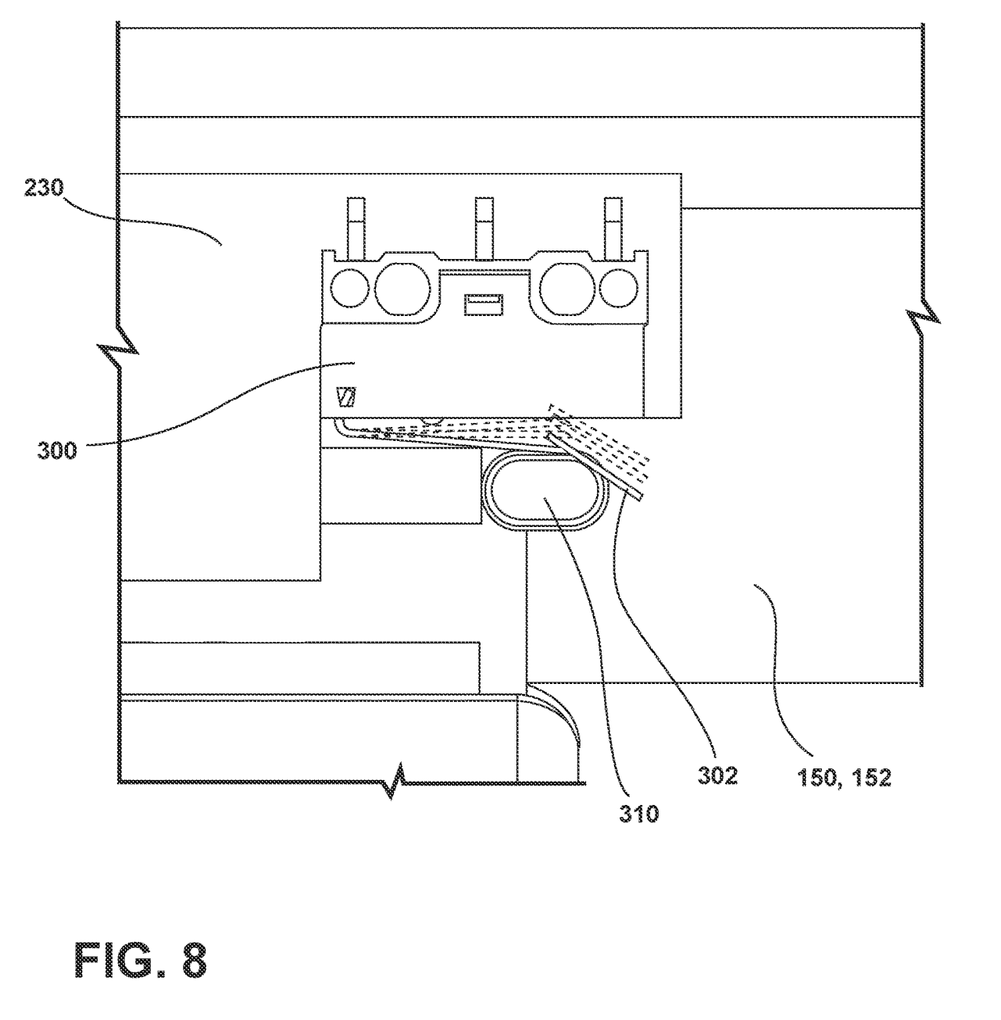
FIG. 8 is an enlarged broken top plan view of the assembly for activation of the wake-up switch of the vehicle brake pedal spring resistance emulator assembly.

Referring to FIGS. 6, 7, and 8, the wake-up switch 300 includes a lever 302 on the side of the wake-up switch 300 which is adapted or configured for movement and engagement in response to contact thereof with a tab 310 extending upwardly from the exterior wall 152 of the sleeve 150 during the sliding movement of the sleeve 150 relative to the housing 130 to activate the wake-up switch 300.

Numerous variations and modifications of the embodiment of the vehicle brake pedal spring resistance emulator assembly 100 of the present arrangements as described above may be effected without departing from the spirit and scope of the novel features. It is to be understood that no limitations with respect to the arrangements illustrated herein are intended or should be inferred. It is, of course, intended to cover by the appended claims all such modifications as fall within the scope of the claims.

What is claimed is:

1. A vehicle pedal emulator assembly comprising:
a housing defining a first interior cavity;
a sleeve extending and adapted for sliding movement in the interior cavity of the housing, the sleeve defining a second interior cavity;
first and second springs in one end of the first interior cavity of the housing, the first and second springs being compressible in response to the sliding movement of the sleeve in the interior cavity of the housing;
a first shaft extending between a first end and a second end in the first interior cavity of the housing, the second end extending into the second interior cavity of the sleeve, the first and second springs surrounding the first shaft; and
third and fourth springs in an opposed end of the first interior cavity of the housing, the third and fourth springs being compressible in response to the sliding movement of the sleeve, wherein the third spring extends between the second end of the first shaft toward an end of the sleeve.

2. The vehicle pedal emulator assembly of claim 1, wherein the third and fourth springs are located in the second interior cavity of the sleeve.

3. The vehicle pedal emulator assembly of claim 1 further comprising:
an inductor sensor for sensing the position of the sleeve relative to the housing; and
a Hall Effect sensor for sensing the position of the sleeve relative to the housing.

4. The vehicle pedal emulator assembly of claim 1 further comprising:
a printed circuit board with an inductive coil and a Hall Effect integrated circuit, the printed circuit board being located on the housing;
an inductive target on the sleeve and moveable relative to the inductive coil in response to the sliding movement of the sleeve relative to the housing; and
a Hall Effect magnet on the sleeve and moveable relative to the Hall Effect integrated circuit in response to the sliding movement of the sleeve relative to the housing.

5. The vehicle pedal emulator assembly of claim 1 wherein the first and second springs are disposed in a telescoping relationship relative to each other.

6. The vehicle pedal emulator assembly of claim 1 wherein the third and fourth springs are disposed in a telescoping relationship relative to each other.

7. The vehicle pedal emulator assembly of claim 1 wherein the first, second, third, and fourth springs are arranged in a parallel relationship.

8. The vehicle pedal emulator assembly of claim 1, wherein the first and third springs are positioned opposite and spaced from each other in a co-linear relationship and the second and fourth springs are positioned opposite and spaced from each other in a co-linear relationship.

9. The vehicle pedal emulator assembly of claim 1, wherein the first shaft and the second shaft are spaced from each other in a co-linear relationship.

10. The vehicle pedal emulator assembly of claim 1, further comprising a second shaft extending through the end of the sleeve and into the interior cavity of the sleeve, the third and fourth springs surrounding the second shaft.

11. A vehicle pedal emulator assembly comprising:
a housing defining an interior cavity;
a sleeve extending and adapted for sliding movement in the first interior cavity of the housing;
first and second springs in one end of the interior cavity of the housing, the first and second springs being compressible in response to the sliding movement of the sleeve in the interior cavity of the housing;
third and fourth springs in an opposed end of the interior cavity of the housing and separated from the first and second springs by a spring receptacle, the third and fourth springs being compressible in response to the sliding movement of the sleeve in the interior cavity of the housing;
a shaft extending in the interior cavity of the housing between a first end and a second end, the second end terminating in the spring receptacle; and
a wake-up switch which is actuable in response to the sliding movement of the sleeve relative to the housing, the wake-up switch further including a lever that is actuable in response to contact with a tab on the sleeve in response to the sliding movement of the sleeve relative to the housing.

12. The vehicle pedal emulator assembly of claim 11 further comprising a printed circuit board located on the housing, the wake-up switch being located on the printed circuit board.

13. A vehicle pedal emulator assembly comprising:
a housing defining a first interior cavity;
a sleeve extending and adapted for sliding movement in the interior cavity of the housing, the sleeve defining a second interior cavity;
a first shaft extending between a first end and a second end in the first interior cavity of the housing, the second end extending into the second interior cavity of the sleeve;
first and second springs in one end of the first interior cavity of the housing, the first and second springs being compressible in response to the sliding movement of the sleeve in the first interior cavity of the housing, the first spring extending into the second interior cavity of the sleeve; and
third and fourth springs in an opposed end of the interior cavity of the housing, the third and fourth springs being compressible in response to the sliding movement of the sleeve in the interior cavity of the housing, the third spring extending into the second interior cavity of the sleeve;
wherein the first spring surrounds the first shaft, and the second spring surrounds the first spring, and
wherein the third spring extends between a receptacle at the second end of the first shaft toward one end of the sleeve.

14. The vehicle pedal emulator assembly of claim 13, wherein the fourth spring extends between an end of the sleeve and an end of the second shaft, the fourth spring surrounding the third spring.

15. The vehicle pedal emulator assembly of claim 13 wherein the first, second, third, and fourth springs are arranged and compressible in a parallel relationship.

16. The vehicle pedal emulator assembly of claim 13 wherein the first and second springs surround the first shaft and extend between one end of the housing and one end of the sleeve.

17. The vehicle pedal emulator assembly of claim 13, wherein the first and third springs are positioned opposite and spaced from each other in a co-linear relationship and the second and fourth springs are positioned opposite and spaced from each other in a co-linear relationship.

18. The vehicle pedal emulator assembly of claim 13, wherein the first shaft and the second shaft are spaced from each other in a co-linear relationship.

19. The vehicle pedal emulator assembly of claim 13, further comprising a second shaft extending in the interior cavity of the housing and into the interior cavity of the sleeve, the third spring extending between an end of the sleeve and an end of the second shaft.

* * * * *